US012794596B2

(12) United States Patent
Singh

(10) Patent No.: US 12,794,596 B2
(45) Date of Patent: Nov. 10, 2026

(54) ON HYBRID AUTOMATIC REPEAT REQUEST (HARQ) PROCESS HANDLING AT EXTREMELY LARGE SUBCARRIER SPACING (SCS)

(71) Applicant: Telefonaktiebolaget LM Ericsson (publ), Stockholm (SE)

(72) Inventor: Bikramjit Singh, Raasepori (FI)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 353 days.

(21) Appl. No.: 18/566,184

(22) PCT Filed: May 31, 2022

(86) PCT No.: PCT/SE2022/050522
§ 371 (c)(1),
(2) Date: Dec. 1, 2023

(87) PCT Pub. No.: WO2022/255925
PCT Pub. Date: Dec. 8, 2022

(65) Prior Publication Data
US 2024/0297742 A1 Sep. 5, 2024

Related U.S. Application Data

(60) Provisional application No. 63/195,936, filed on Jun. 2, 2021.

(51) Int. Cl.
*H04L 1/1822* (2023.01)
*H04L 1/1867* (2023.01)
*H04L 5/00* (2006.01)

(52) U.S. Cl.
CPC .......... *H04L 1/1822* (2013.01); *H04L 1/1893* (2013.01); *H04L 5/0098* (2013.01)

(58) Field of Classification Search
CPC ... H04L 1/1822; H04L 1/1893; H04L 5/0098; H04L 5/0055; H04L 1/1812
See application file for complete search history.

(56) References Cited

U.S. PATENT DOCUMENTS

2013/0083741 A1* 4/2013 Larsson ................ H04W 52/48 370/329
2020/0382207 A1 12/2020 Medles et al.
2022/0345253 A1* 10/2022 Zewail .................. H04L 1/1822

FOREIGN PATENT DOCUMENTS

CN 112019308 B * 6/2023 ........... H04L 5/0055
WO WO-2021163968 A1 * 8/2021 ............ H04W 72/04

OTHER PUBLICATIONS

International Search Report and Written Opinion dated Sep. 15, 2022 for International Application No. PCT/SE2022/050522 filed May 31, 2022; consisting of 11 pages.

(Continued)

*Primary Examiner* — Thai Nguyen
(74) *Attorney, Agent, or Firm* — Weisberg I.P. Law, P.A.

(57) ABSTRACT

A method, system and apparatus for hybrid automatic repeat request (HARQ) process handling at extremely large subcarrier spacing (SCS) are disclosed. According to one aspect, a method in a network node includes configuring a first wireless device (WD) of a plurality of WDs with a maximum number N of HARQ process numbers (HPN) corresponding to N HARQ processes between the first WD of the plurality of WDs and the network node, the maximum number N being based at least in part on a traffic requirement of at least one WD of the plurality of WDs.

18 Claims, 13 Drawing Sheets

(56) References Cited

OTHER PUBLICATIONS

3GPP TSG RAN WG1 Meeting #103e R1-2008810, Title: HARQ in NR-NTN, Agenda Item: 8.4.3, Source: MediaTek Inc., Document for: Discussion and Decision, Date: Oct. 26-Nov. 13, 2020, consisting of 5 pages.

3GPP TS 38.214 V16.5.0; 3rd Generation Partnership Project; Technical Specification Group Radio Access Network; NR; Physical layer procedures for data (Release 16); Mar. 2021; consisting of 171 pages.

3GPP TS 38.321 V16.4.0; 3rd Generation Partnership Project; Technical Specification Group Radio Access Network; NR; Medium Access Control (MAC) protocol specification (Release 16); Mar. 2021; consisting of 157 pages.

* cited by examiner

TRAFFIC MODELS - DETAILS

AGREED

| DL VIDEO | AR/VR | CG |
|---|---|---|
| DATA RATE (Mbps) | 30, 45 (60) | 8, 30 (45) |
| FRAME RATE (fps) | 60 (30, 90, 120) | 60 |
| PACKET DELAY BUDGET (ms) | 10 (5, 20) | 15 (10, 30) |

NOT A GREED - LIKELY OUTCOME

| UL SCENE UPLOAD | AR |
|---|---|
| DATA RATE (Mbps) | 20 (2, 4, 10) |
| FRAME RATE (fps) | 60 (30, 120) |
| PACKET DELAY BUDGET (ms) | 60 (30, 40, 100) |

| UL POSE/CONTROL | CG/VR |
|---|---|
| PACKET SIZE (BYTES) | 100 |
| PERIOD (ms) | 4 |
| PACKET DELAY BUDGET (ms) | 10 |

FIG. 1

ON HYBRID AUTOMATIC REPEAT REQUEST (HARQ) PROCESS HANDLING AT EXTREMELY LARGE SUBCARRIER SPACING (SCS)

CROSS-REFERENCE TO RELATED APPLICATIONS

This application is a Submission Under 35 U.S.C. § 371 for U.S. National Stage Patent Application of International Application No.: PCT/SE2022/050522, filed May 31, 2022 entitled "ON HYBRID AUTOMATIC REPEAT REQUEST (HARQ) PROCESS HANDLING AT EXTREMELY LARGE SUBCARRIER SPACING (SCS)," which claims priority to U.S. Provisional Application No.: 63/195,936, filed Jun. 2, 2021, entitled "ON HARQ PROCESS HANDLING AT EXTREMELY LARGE SCS," the entireties of both of which are incorporated herein by reference.

TECHNICAL FIELD

The present disclosure relates to wireless communications, and in particular, to hybrid automatic repeat request (HARQ) process handling at extremely large subcarrier spacing (SCS).

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

Sections 5.1 and 6.1 of 3GPP Technical Standard (TS) 38.214 address downlink (DL) and uplink (UL) shared channel procedure and HARQ process identification (ID) number impact. Sections 5.3, 5.3.1, 5.4 and 5.4.1 of 3GPP TS 38.321 address HARQ process ID derivation, autonomous selection.

Some websites presenting information on downlink control information (DCI) formats in a simplified manner include:

https://itectec.com/spec/7-3-1-dci-formats/; and https://www.sharetechnote.com/html/5G/5G_HARQ.html;

FIG. 1 shows example of traffic model agreements related to extended reality (XR) traffic from 3GPP meeting 104*e*.

During the course of 5G evolution or 6G, there is expected an increase of cases which require too many ongoing HARQ processes. Also, cellular technology continues to expand to larger subcarrier spacings (SCS), e.g., 480 KHz SCS to even 1920 KHz for data transmission is expected. This means the transmission slot size will be on the order of 10~30 μseconds. The current limitations of 16 HARQ processes (per cell) is insufficient where volumes of transmissions may surpass thousands or millions within a second (especially over large SCS cases like 480 KHz). As the transmission duration becomes small, the ability of a network to initiate large numbers of HARQ processes increases where these processes can span over large slots due to multiple signaling events per process, e.g., feedback, retransmission, etc.

Assuming that 15 KHz SCS can afford 16 HARQ process simultaneously in 1 millisecond (ms), then for 1920 KHz SCS, 6G systems may have 16*1920/15~2K HARQ processes. Thus, in 1 second there will be 2 million HARQ processes. Assume 2K simultaneous HARQ processes are allowed, and this is an estimation, which could be substantially greater or less in the future. For 2K HARQ processes, about 11 bits are needed in the downlink control information (DCI) to distinguish between the HARQ processes. This is almost half of the current DCI load (excluding current HARQ ID and cyclic redundance check (CRC) from format 0_0, as an example). Also, the control resource set (CORESETs) cannot be expanded to include large DCIs without impacting data transmission resources as both control and data transmission resources must be squeezed into the same resource grid.

An additional issue is for low latency transmission. There is a possibility for retransmission (no latency budget for retransmission) as the transmission is one-shot only. In this case, HARQ ID is unnecessary and is useless to carry in the grants or assignments.

SUMMARY

Some embodiments advantageously provide methods, systems, and apparatuses for hybrid automatic repeat request (HARQ) process handling at extremely large subcarrier spacing (SCS). Examples of subcarrier spacings (SCS) include 60, 120, 240, 480, 960 and 1960 kilo-Hertz (kHz). As a non-limiting example, 1960 kHz may be considered a "large" or "extremely" large SCS. Other subcarrier spacings may be employed. For example, in the FR2 band from 24 to 50 Giga-Hertz (GHz), there may be configured 60 to 120 kHz SCS, and in higher bands such as at 100 GHz, there may be configured a range of SCS having a maximum SCS that is higher than 120 kHz.

According to some aspects, DCI providing grants, assignments, or other allocations with or without indicating HARQ Process number (HPN) or HARQ process ID (HP ID) in the DCI may be implemented. Sixth Generation can use a large DCI size to include a HARQ process number (HPN). With current DCI sizes, there is support for up to 16 HARQ processes. 6G may increase a DCI by, for example, 6 bits to support thousands of HARQ processes. As a non-limiting example, such a DCI size may be considered "large". Other DCI sizes may be employed. In some embodiments, the number of DCI bits to support a maximum of N HARQ processes may be given by a ceiling function that returns a "largest" number of bits less than or equal to the square root of N.

These grants, assignments or allocations can be for:

1. Single or multiple physical uplink shared channel (PUSCH) (UL transport block (TB)) allocation;
2. Single or multiple physical downlink shared channel (PDSCH) (DL TB) allocation; and/or
3. Single or multiple physical sidelink shared channel (PSSCH) (Sidelink TB) allocation.

In 5G NR, a dynamic grant DCI always includes HARQ ID. Some embodiments disclosed herein may be more suitable for 6G asynchronous DL or UL HARQ transmissions.

DCI sizes can be flexibly configured with or without including HPNs and successively deriving HPNs using other methods, e.g., based on resource mapping when deemed necessary, e.g., in order to pursue retransmission.

Some embodiments may enable:

Flexible configuration of DCI depending on a requirement of retransmission, which may result in a reduction of DCI size by removing a HARQ Id bitfield;

DCI size interaction with HARQ ID specifically when SCSs are extremely large (where HARQ Id representation may consume 10s of bits if included);

Even if the retransmissions are required, reduction in size related initial grant/assignment DCI is provided;

If DCI is made too small, then this lighter DCI can have good reliability as a WD is required to decode fewer bits (DCI bits). In some embodiments, HARQ ID bitfields which may span over 10s of bits are reduced. Some embodiments include other enhancements, e.g., if the partial resource allocation can be defined beforehand (e.g., fixed modulation and coding scheme (MCS), fixed frequency domain resource assignment (FDRA), etc.), then the achieved DCI duration (length) can be shorter or have fewer bits devoted to HARQ processes; and Further, such shorter DCI can be useful for low latency applications, because a smaller DCI consumes less resources and also will be faster to process.

According to one aspect a network node is configured to configure a first WD of the plurality of WDs with a maximum number N of hybrid automatic repeat request, HARQ, process numbers, HPN, corresponding to N HARQ processes between the first WD of the plurality of WDs and the network node, the maximum number N being based at least in part on a traffic requirement of at least one WD of the plurality of WDs.

According to this aspect, in some embodiments, N is based at least in part on a number of HARQ processes indicated by the first WD. In some embodiments, a HARQ pool is allocated to the first WD, HARQ processes in the HARQ pool being one of selected randomly or based at least in part on a formula. In some embodiments, the HARQ pool comprises sub-pools, each sub-pool corresponding to a different traffic flow with the first WD. In some embodiments, at least one of N, an indication of a formula for deriving an HPN, and a HARQ pool configuration are transmitted to the first WD. In some embodiments, a HARQ ID-less grant is allocated without specifying an HPN in downlink control information, DCI. In some embodiments, the HARQ ID-less grant is sent in response to a scheduling request, SR, from the first WD.

According to another aspect, a method in network node includes configuring a first WD of the plurality of WDs with a maximum number N of hybrid automatic repeat request, HARQ, process numbers, HPN, corresponding to N HARQ processes between the first WD of the plurality of WDs and the network node, the maximum number N being based at least in part on a traffic requirement of at least one WD of the plurality of WDs.

According to this aspect, in some embodiments, N is based at least in part on a number of HARQ processes indicated by the first WD. In some embodiments, the method also includes allocating a HARQ pool to the first WD, HARQ processes in the HARQ pool being one of selected randomly or based at least in part on a formula. In some embodiments, the HARQ pool comprises sub-pools, each sub-pool corresponding to a different traffic flow with the first WD. In some embodiments, at least one of N, an indication of a formula for deriving an HPN, and a HARQ pool configuration are transmitted to the first WD. In some embodiments, the method includes allocating a HARQ ID-less grant without specifying an HPN in downlink control information, DCI. In some embodiments, the HARQ ID-less grant is sent in response to a scheduling request, SR, from the first WD.

According to yet another aspect, a WD is configured to determine a set of M hybrid automatic repeat request, HARQ, process numbers, HPN, corresponding to M HARQ processes between the WD and the network node, the M HARQ processes being selected from a pool of HARQ processes limited in number by an integer N received from the network node.

According to this aspect, in some embodiments, the WD is further configured to transmit a recommended maximum number of HARQ processes to include in the pool of HARQ processes. In some embodiments, the selecting is one of random, based at least in part on a formula, and based at least in part on a traffic flow. In some embodiments, the WD derives an HPN from resource mapping. In some embodiments, the HPN is determined based at least in part on resources that include at least one of a special frame number, slot number, sub-slot number, subcarrier spacing value, demodulation reference signal placement and transmission size. In some embodiments, the WD sends a HARQ acknowledgement, ACK or non-acknowledgment, NACK, according to a rule defined by the network node.

According to another aspect, a method in a WD includes determining a set of M hybrid automatic repeat request, HARQ, process numbers, HPN, corresponding to M HARQ processes between the WD and the network node, the M HARQ processes being selected from a pool of HARQ processes limited in number by an integer N received from the network node.

According to this aspect, in some embodiments, the method also includes transmitting a recommended maximum number of HARQ processes to include in the pool of HARQ processes. In some embodiments, the selecting is one of random, based at least in part on a formula, and based at least in part on a traffic flow. In some embodiments, the method further includes deriving an HPN from resource mapping. In some embodiments, the HPN is determined based at least in part on resources that include at least one of a special frame number, slot number, sub-slot number, subcarrier spacing value, demodulation reference signal placement and transmission size. In some embodiments, the method also include sending a HARQ acknowledgement, ACK or non-acknowledgment, NACK, according to a rule defined by the network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 1 is an example of a set of tables having traffic model details;

DETAILED DESCRIPTION

Figure 2:
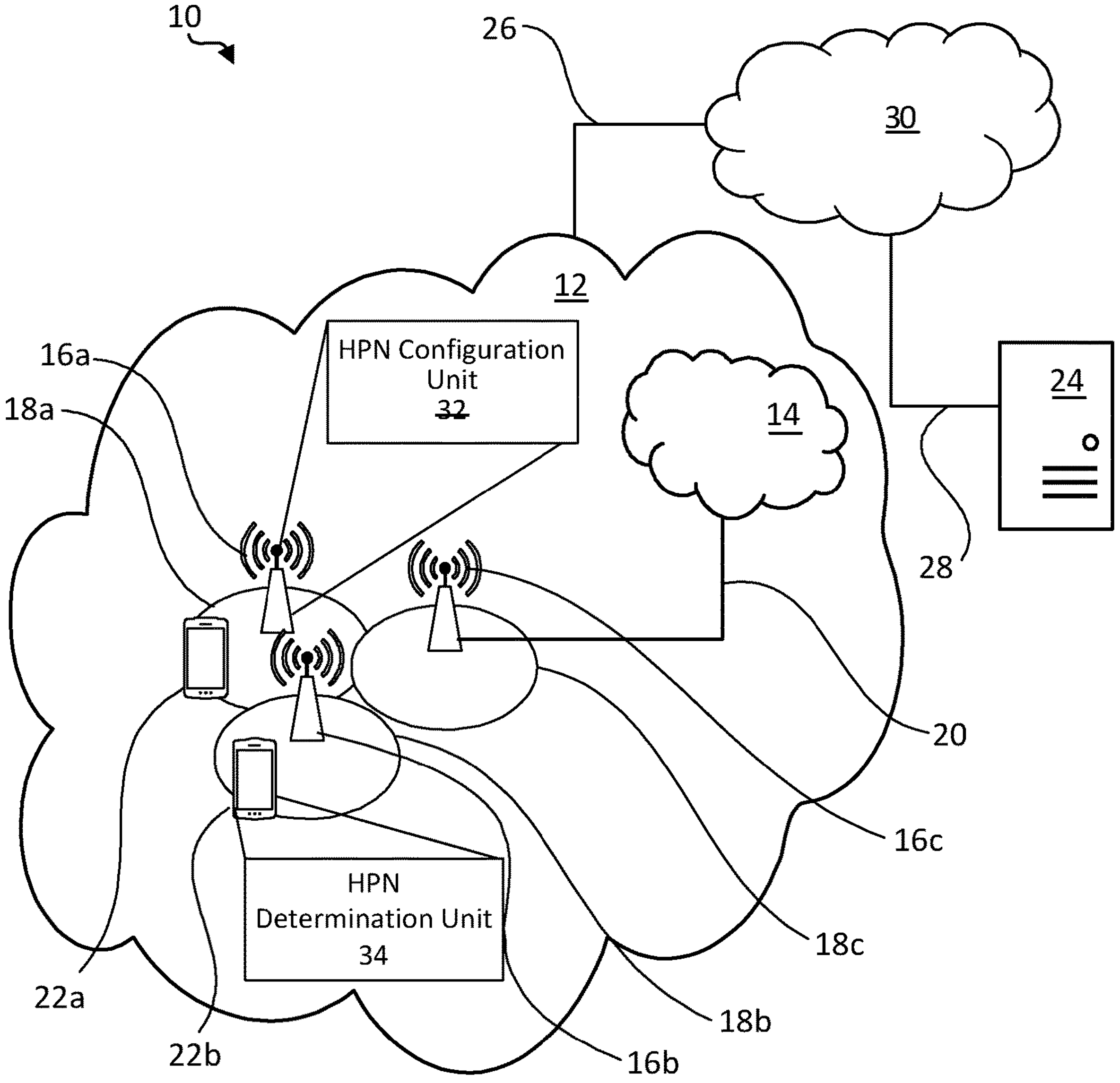
FIG. 2 is a schematic diagram of an example network architecture illustrating a communication system connected via an intermediate network to a host computer according to the principles in the present disclosure.

Before describing in detail example embodiments, it is noted that the embodiments reside primarily in combinations of apparatus components and processing steps related to hybrid automatic repeat request (HARQ) process handling at extremely large subcarrier spacing (SCS). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide hybrid automatic repeat request (HARQ) process handling at extremely large sub-carrier spacing (SCS). Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include an HPN configuration unit 32 which is configured to configure a first WD of the plurality of WDs with a maximum number N of hybrid automatic repeat request, HARQ, process numbers, HPN, corresponding to N HARQ processes between the first WD of the plurality of WDs and the network node, the maximum number N being based at least in part on a traffic requirement of at least one WD of the plurality of WDs. A wireless device 22 is configured to include an HPN determination unit 34 which is configured to determine a set of M hybrid automatic repeat request, HARQ, process numbers, HPN, corresponding to M HARQ processes between the WD and the network node, the M HARQ processes being selected from a pool of HARQ processes limited in number by an integer N received from the network node.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include an HPN configuration unit 32 which is configured to configure a first WD of the plurality of WDs with a maximum number N of hybrid automatic repeat request, HARQ, process numbers, HPN, corresponding to N HARQ processes between the first WD of the plurality of WDs and the network node, the maximum number N being based at least in part on a traffic requirement of at least one WD of the plurality of WDs.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an HPN determination unit 34 which is configured to determine a set of M hybrid automatic repeat request, HARQ, process numbers, HPN, corresponding to M HARQ processes between the WD and the network node, the M HARQ processes being selected from a pool of HARQ processes limited in number by an integer N received from the network node.

Figure 3:
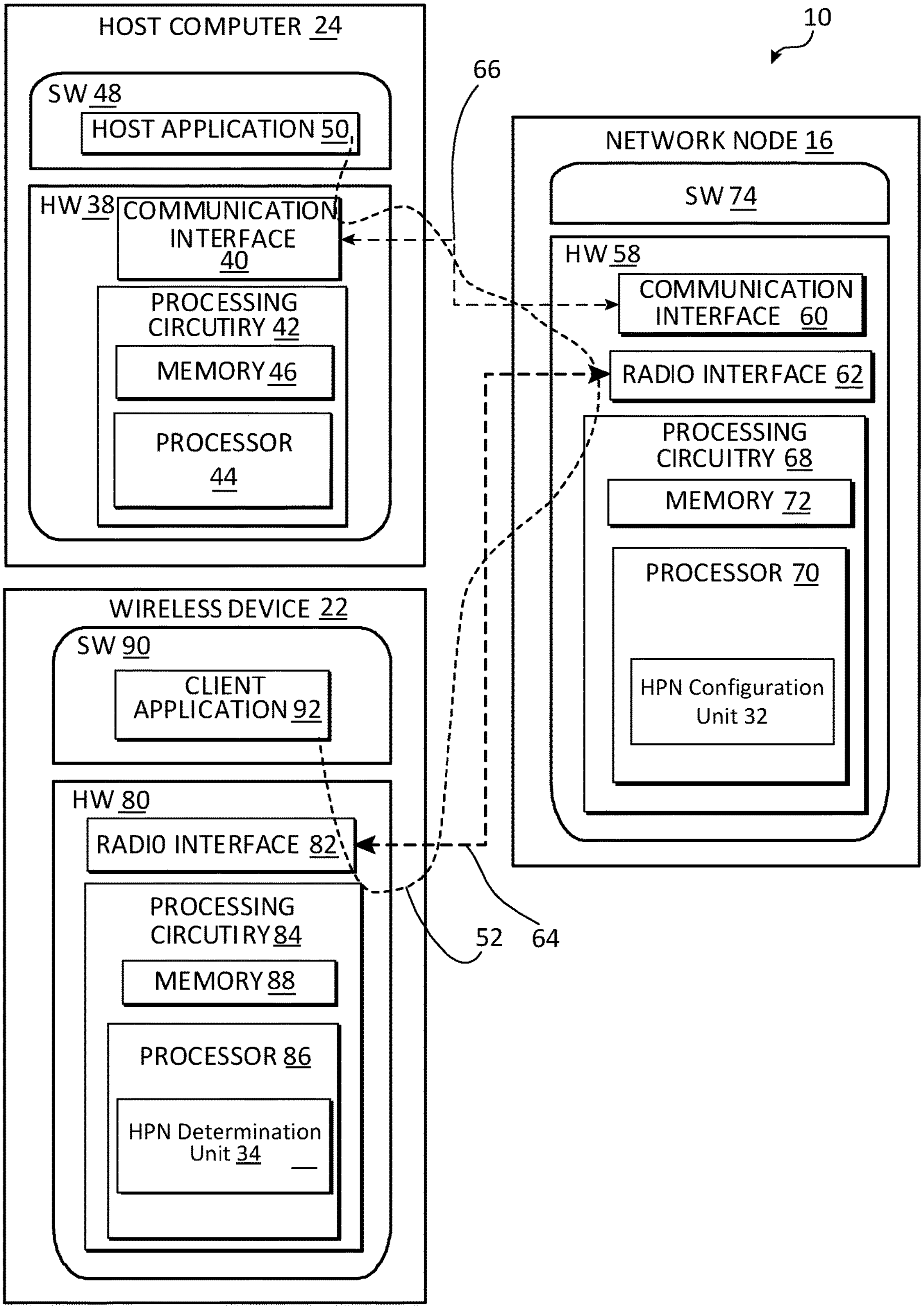
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as HPN configuration unit 32 and HPN determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
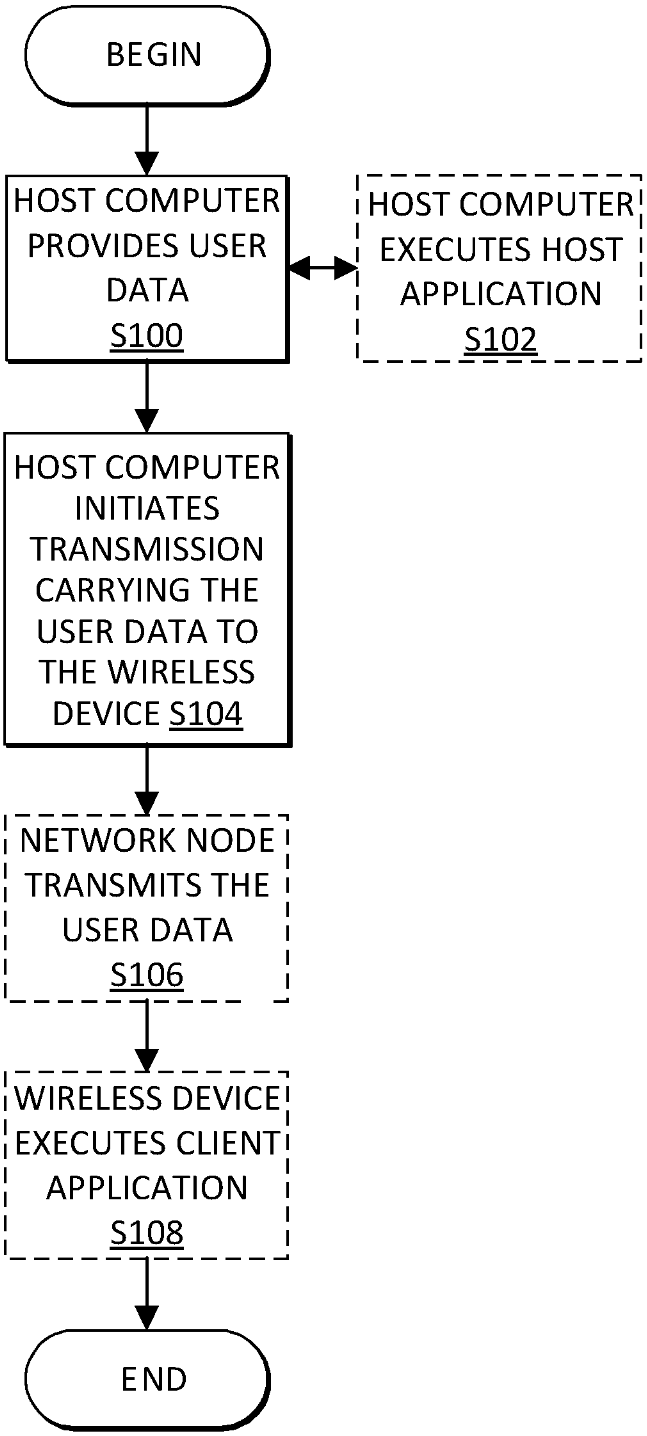
FIG. 4 is a flowchart illustrating example methods implemented in a communication system including a host computer, a network node and a wireless device for executing a client application at a wireless device according to some embodiments of the present disclosure.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 5:
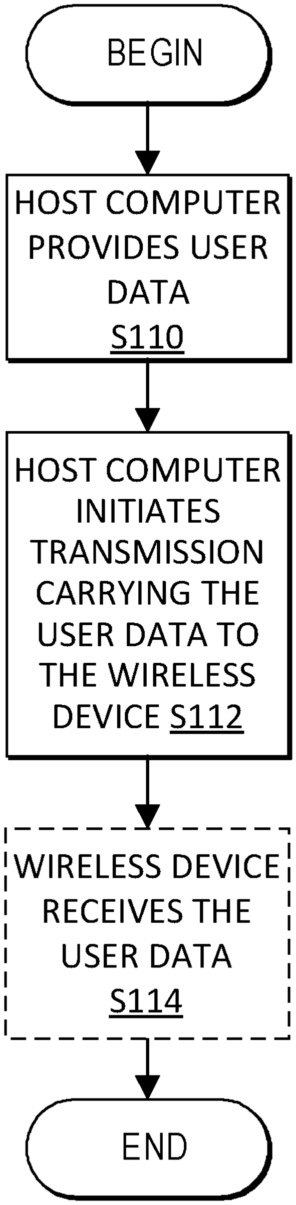
FIG. 5 is a flowchart illustrating example methods implemented in a communication system including a host computer, a network node and a wireless device for receiving user data at a wireless device according to some embodiments of the present disclosure.

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 6:
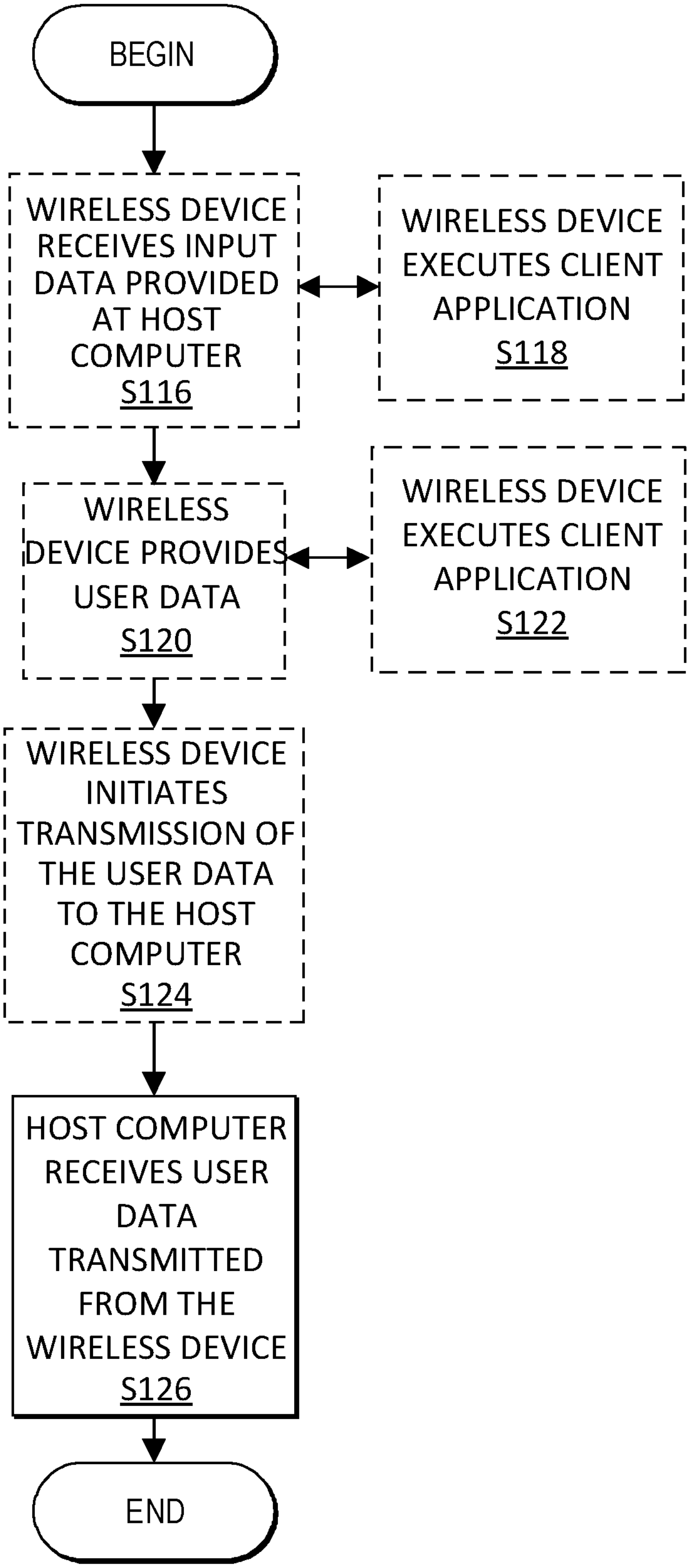
FIG. 6 is a flowchart illustrating example methods implemented in a communication system including a host computer, a network node and a wireless device for receiving user data from the wireless device at a host computer according to some embodiments of the present disclosure.

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 7:
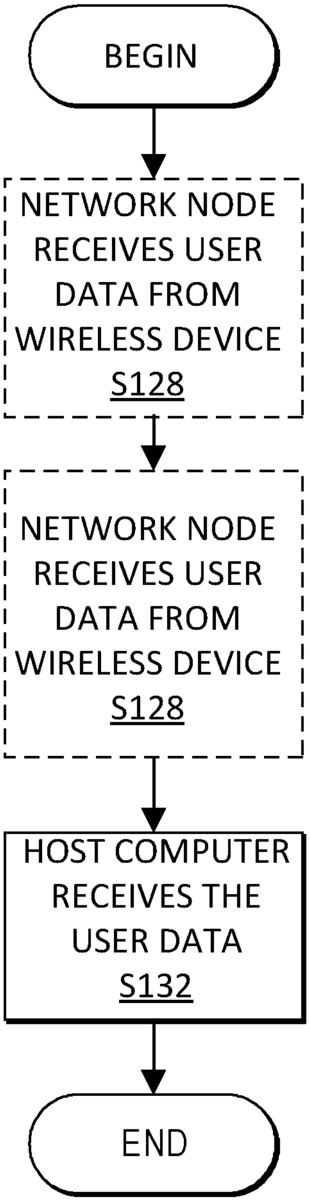
FIG. 7 is a flowchart illustrating example methods implemented in a communication system including a host computer, a network node and a wireless device for receiving user data at a host computer according to some embodiments of the present disclosure.

FIG. 7 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
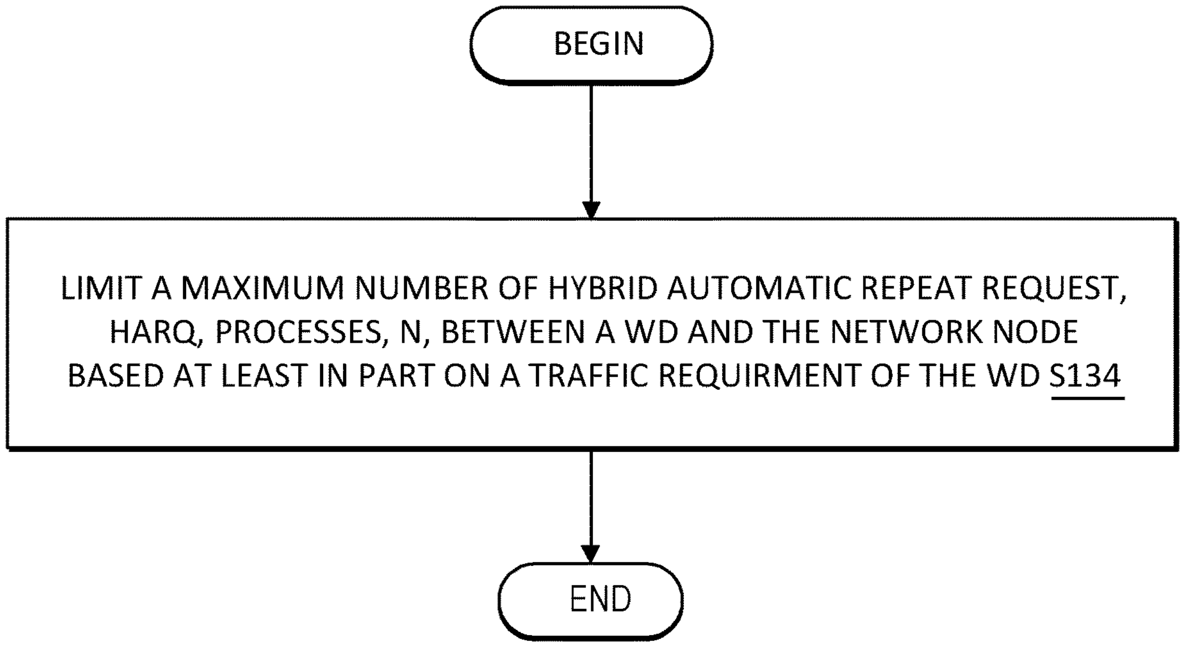
FIG. 8 is a flowchart of an example process in a network node for hybrid automatic repeat request (HARQ) process handling at extremely large subcarrier spacing (SCS)

FIG. 8 is a flowchart of an example process in a network node 16 for hybrid automatic repeat request (HARQ) process handling, such as for extremely large subcarrier spacing (SCS). One or more blocks described herein may be performed by one or more elements of network node 16 such as by one or more of processing circuitry 68 (including the HPN configuration unit 32), processor 70, radio interface 62 and/or communication interface 60. Network node 16 such as via processing circuitry 68 and/or processor 70 and/or radio interface 62 and/or communication interface 60 is configured to limit a maximum number of hybrid automatic repeat request, HARQ, processes, N, between a WD and the network node based at least in part on a traffic requirement of the WD (Block S134).

Figure 9:
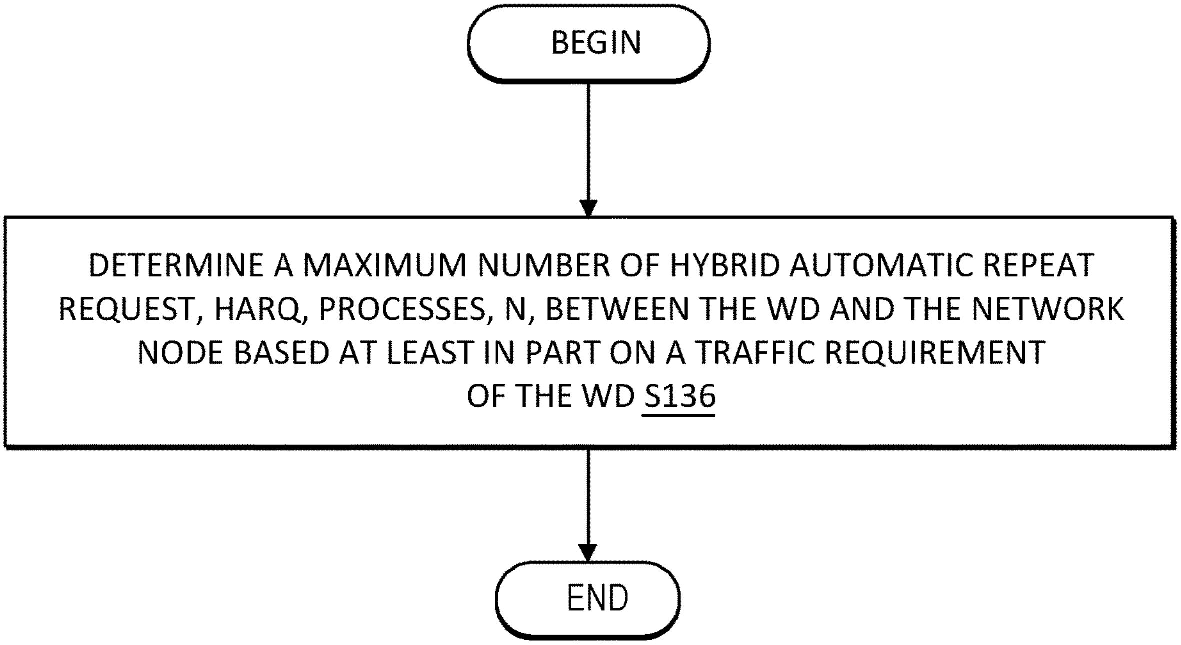
FIG. 9 is a flowchart of an example process in a wireless device for hybrid automatic repeat request (HARQ) process handling at extremely large subcarrier spacing (SCS)

FIG. 9 is a flowchart of an example process in a wireless device 22 according to some embodiments of the present disclosure. One or more blocks described herein may be performed by one or more elements of wireless device 22 such as by one or more of processing circuitry 84 (including the HPN determination unit 34), processor 86, radio interface 82 and/or communication interface 60. Wireless device 22 such as via processing circuitry 84 and/or processor 86 and/or radio interface 82 is configured to determine a maximum number of hybrid automatic repeat request, HARQ, processes, N, between the WD and the network node based at least in part on a traffic requirement of the WD (Block S136).

Figure 10:
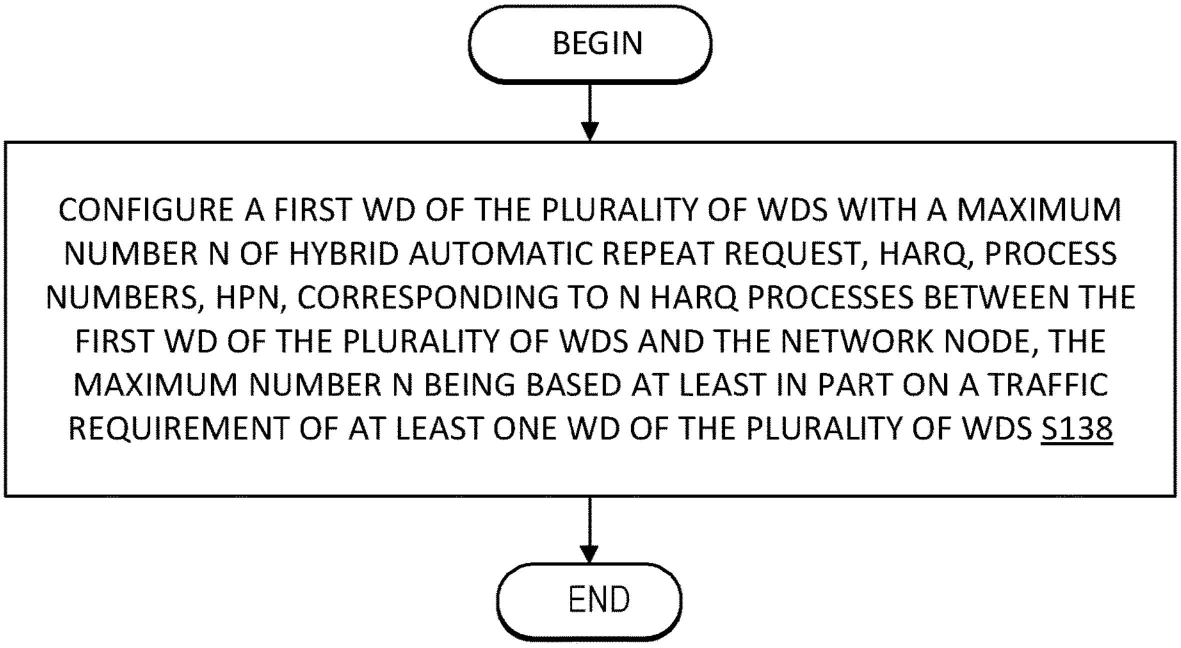
FIG. 10 is a flowchart of another example process in a network node for hybrid automatic repeat request (HARQ) process handling at extremely large subcarrier spacing (SCS)

FIG. 10 is a flowchart of an example process in a network node 16 for hybrid automatic repeat request (HARQ) process handling, such as for extremely large subcarrier spacing (SCS). One or more blocks described herein may be performed by one or more elements of network node 16 such as by one or more of processing circuitry 68 (including the HPN configuration unit 32), processor 70, radio interface 62 and/or communication interface 60. Network node 16 such as via processing circuitry 68 and/or processor 70 and/or radio interface 62 and/or communication interface 60 is configured to configure a first WD of the plurality of WDs with a maximum number N of hybrid automatic repeat request, HARQ, process numbers, HPN, corresponding to N HARQ processes between the first WD of the plurality of WDs and the network node, the maximum number N being based at least in part on a traffic requirement of at least one WD of the plurality of WDs (Block S138).

In some embodiments, N is based at least in part on a number of HARQ processes indicated by the first WD. In some embodiments, the method also includes allocating a HARQ pool to the first WD, HARQ processes in the HARQ pool being one of selected randomly or based at least in part on a formula. In some embodiments, the HARQ pool comprises sub-pools, each sub-pool corresponding to a different traffic flow with the first WD. In some embodiments, at least one of N, an indication of a formula for deriving an HPN, and a HARQ pool configuration are transmitted to the first WD. In some embodiments, the method includes allocating a HARQ ID-less grant without specifying an HPN in downlink control information, DCI. In some embodiments, the HARQ ID-less grant is sent in response to a scheduling request, SR, from the first WD.

Figure 11:
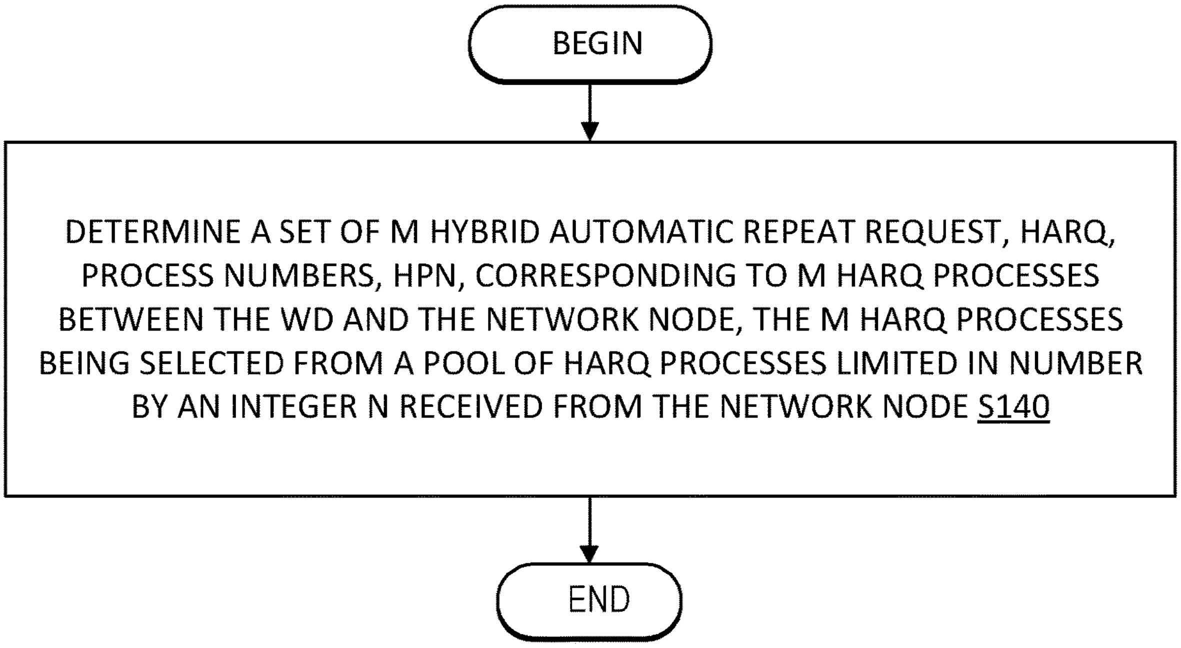
FIG. 11 is a flowchart of another example process in a wireless device for hybrid automatic repeat request (HARQ) process handling at extremely large subcarrier spacing (SCS)

FIG. 11 is a flowchart of an example process in a wireless device 22 according to some embodiments of the present disclosure. One or more blocks described herein may be performed by one or more elements of wireless device 22 such as by one or more of processing circuitry 84 (including the HPN determination unit 34), processor 86, radio interface 82 and/or communication interface 60. Wireless device 22 such as via processing circuitry 84 and/or processor 86 and/or radio interface 82 is configured to determine a set of M hybrid automatic repeat request, HARQ, process numbers, HPN, corresponding to M HARQ processes between the WD and the network node, the M HARQ processes being selected from a pool of HARQ processes limited in number by an integer N received from the network node (Block S140).

In some embodiments, the method also includes transmitting a recommended maximum number of HARQ processes to include in the pool of HARQ processes. In some embodiments, the selecting is one of random, based at least in part on a formula, and based at least in part on a traffic flow. In some embodiments, the method further includes deriving an HPN from resource mapping. In some embodiments, the HPN is determined based at least in part on resources that include at least one of a special frame number, slot number, sub-slot number, subcarrier spacing value, demodulation reference signal placement and transmission size. In some embodiments, the method also include sending a HARQ acknowledgement, ACK or non-acknowledgment, NACK, according to a rule defined by the network node.

Having described the general process flow of arrangements of the disclosure and having provided examples of hardware and software arrangements for implementing the processes and functions of the disclosure, the sections below provide details and examples of arrangements for hybrid automatic repeat request (HARQ) process handling at extremely large subcarrier spacing (SCS).

In some embodiments a HARQ rule may be based on a maximum fixed number of HARQ processes, e.g., not limited to 16 HARQ processes (HPs).

In some embodiments, the maximum number of HARQ processes, Nmax, which can be greater than 16, can be determined, e.g., based on:

- a) A traffic requirement of a WD 22, e.g., XR, ultra-reliable low latency communications (URLLC), mobile broadband (MBB), evolved MBB, voice over Internet protocol (VOIP);
  - i) XR data may be transmitted using multiple slots per transport block (TB) (e.g., TBoMs, i.e., TB over multiple slots) which can be very large in number. Thus, a large number of HARQ process, i.e., greater than 16, may be required;
  - ii) In some embodiments, a WD 22 can provide an indication of HARQ process requirements. Therefore, the network node 16 can configure or allocate the WD 22 with a certain maximum number of HARQ IDs. For example, suppose WD #1 22*a* is configured with a maximum of 32 HARQ IDs when allocating downlink control information (DCI) for dynamic allocation when the HARQ ID does not go beyond 32 or for semipersistent scheduling/configured grants (SPS/CG). Suppose also that for WD #2 22*b*, the maximum number of HARQ ID can be 64. This means different WDs can be configured with different maximals (maximum number of HARQ IDs) based on their requirements;
- b) SCS of the cell/bandwidth part (BWP):
  - i) In some embodiments, the maximum number of HARQ processes, Nmax, is suggested by the WD 22 to, i.e., provided by the WD 22 to the network node 16. This is reasonable, as the WD 22 knows the traffic originating from its application layer. In some embodiments, the WD 22 can send a request to the network node 16 to configure Nmax with the suggested value;
  - ii) In some embodiments, in response to a request by the WD 22, the network node 16 can respond positively, reject or allocate or suggest a different Nmax value;
  - iii) In some embodiments, the network node 16 can allocate a HARQ pool to a WD 22; the HARQ pool may constitute the set of HPNs which the WD 22 can utilize for its transmissions;
- c) The WD 22 can select a HARQ process number (HPN) from the pool:
  - i) Randomly; or
  - ii) based on some deterministic formula which both the WD 22 and the network node 16 knows, the network node 16 providing the formula in the WD's radio resource control (RRC) setting for its TB transmission;
- d) In some embodiments, the network node 16 can provided multiple sub-pools for different traffic within a WD 22:
  - i) In NR-U, there is a HARQ pool, but there is no distinction among traffic. Also, the limited feature for NR-U does not exist for NR.
  - ii) In some embodiments, the network node 16 can send DCI, DL medium access control (MAC) control element (CE) or RRC configuration to indicate non-limiting options;
- e) maximum number of HARQ processes, Nmax;
- f) HP formulae to derive HPN number, e.g., for UL carrier group (CG) transmissions (by WD 22); and/or
- g) HARQ pools or sub-pools configuration.

In some embodiments, the WD 22 derives or selects an HPN (from a pool or set or based on deterministic formulas) and uses the indicated HARQ process for UL transmission (multiplexed with uplink control information (UCI)) associated with a certain traffic. For example, the network node 16 may allocate 1000 HPNs, from 0 to 999, and may stipulate a condition, e.g., 0 to 99 HPNs are allocated for URLLC traffic and 100 to 999 HPNs are allocated to eMBB traffic.

In some embodiments, for a given data transmission, the receiving node (network node 16 or WD 22) derives HPN from resource mapping for the data transmission. This is because when HPN is a large value, including the HPN in the DCI or UCI is not efficient because the HPN may consume significant numbers of bits. In one non-limiting example, a maximum number N of HARQ processes may be 1024 instead of 16, which would mean using 10 bits of the DCI to indicate N to a WD instead of 4 bits, the HPN being "large" in this context. As other examples, the maximum number of HARQ processes may be 500, 1000, 2000, etc.

Assume in 6G that there may be ongoing millions (106) of HARQ processes (HPs) which can require 20 bits in DCI. Deriving HPN based on resource mapping may result in transmission allocations on a resource grid that is more efficient, and this methodology can be utilized for allocating or deriving HPN for:

- h) Dynamic scheduled (physical uplink shared channel (PUSCH)/physical downlink shared channel (PDSCH)) transmission;
  - i) The network node 16 does not include HPN in the DCI for PUSCH/PDSCH allocation. Rather the HPN is derived from resource mapping where the PUSCH/PDSCH are being transmitted;
- i) CG/SPS based transmission:

In some embodiments, the HPN (or HARQ process ID) which is calculated based on resources, may include the following non-limiting options:

- j) SFN;
- k) Slot number;
- l) Sub-slot number;
- m) SCS value;

n) Demodulation reference signal (DMRS) placement; and/or o) Transmission size.

Further, when retransmissions are required, in the retransmission DCI, the network node 16 can indicate HPN. Therefore, one or more of the following configurations may be applied:

p) If the HPN is not indicated in DCI, then the HPN may be derived based on resource mapping;

i) Such DCIs may be considered as HARQ-ID less grant or assignment DCIs;

q) If the HPN is indicated in DCI, then the HPN is not derived based on resource mapping. Rather, the WD 22 assumes HPN based on the field indicated in DCI. In other words, the HPN indicted in the bitfield in DCI supersedes the HPN derivation based on resource mapping;

r) If the HPN is indicated in the DCI, then the transmission is assumed as retransmission; and/or s) If the HPN is not indicated in the DCI, but is rather derived based on resource mapping, then the transmission is assumed to be an initial transmission.

In some embodiments, the allocation resource (e.g., the set of physical resource blocks (PRBs), slots, bit error patterns (BEPs), cells) can be separate for allocation of resources and for initial transmissions or retransmissions. This means the network node 16 divides the resources on the resource grid into 2 types:

t) Resource type 1—only initial transmissions are allocated; and u) Resource type 2—only retransmissions are allocated.

Figure 12:
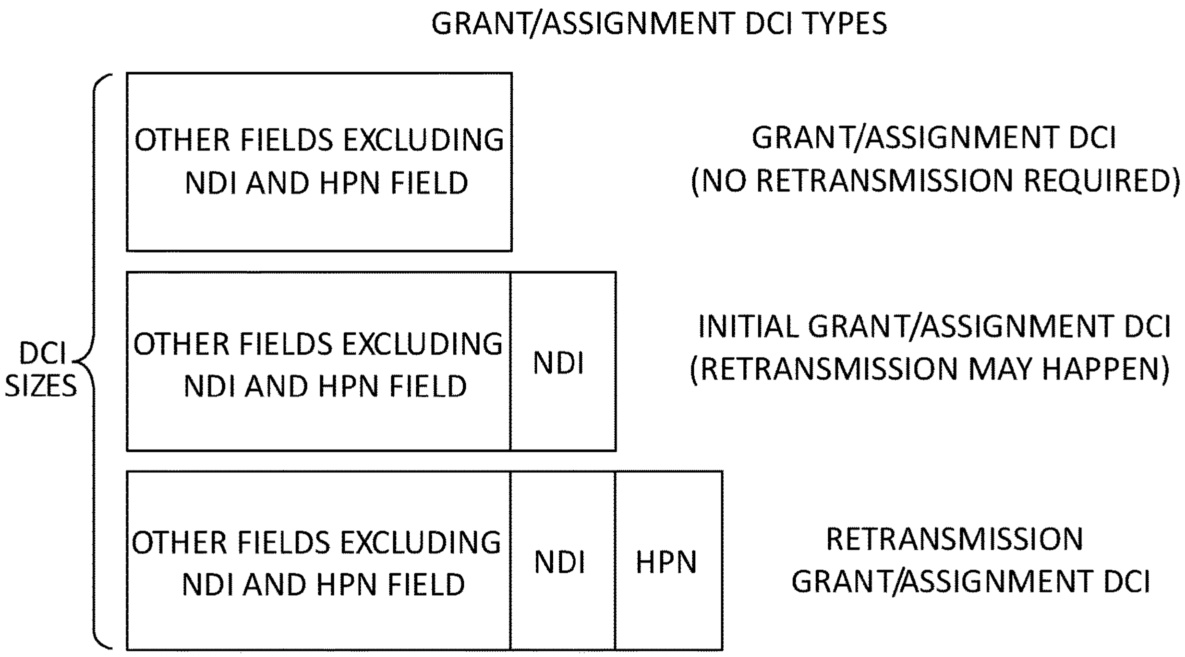
FIG. 12 is an illustration of grant or assignment DCI types.

This may be beneficial when the allocation of certain transmission points to resource type 1. Then, the WD 22 may expect to derive the HPN based on the resource mapping. When certain transmissions point to resource type 2, then the WD 22 expects this transmission as a retransmission and WD 22 expects the HPN in the DCI. This is shown in the example of FIG. 12.

In some embodiments, 3 types of DCI sizes can be introduced, where:

v) In one DCI size, the bit field related to HARQ ID (HPN) is not present in a grant or assignment DCI (such cases can exist for low latency transmissions):

i) HPN is not allocated or not applied as retransmission is not expected; and/or ii) If there is no retransmission, then NDI field can be removed in this DCI;

w) In one DCI size, the bit field related to HARQ ID (HPN) is not present in the grant or assignment DCI pertaining to initial transmission:

i) HPN is derived using resource mapping; and/or x) In one DCI size, the bit field related to HARQ ID (HPN) is present in the grant or assignment DCI pertaining to retransmission.

In some embodiments, the DCIs can be mapped to control resources, e.g., based on resources differentiated by:

y) CORESETs;

z) BWP; and/or aa) Cell.

This means that when a WD 22 receives DCI in a specific CORESET/BWP/cell, then it maps to one or more DCI sizes, in some embodiments.

In some embodiments, the WD 22 asks for retransmission for DL transmission by indicating HPN in uplink control information (UCI), where UCI can be a scheduling request (SR), or retransmission request in other ways transmitted over a shared channel, or a control channel or a MAC CE.

bb) This option may be relevant when HPN are derived as per resource mapping and the WD 22 did not decode the DL transmission or missed the DL transmission, or decodes the transmission with poor gains. Then in a retransmission request over UCI indicating the HPN, the WD 22 performs the request action for retransmission of DL transmission for the intended HPN, in some embodiments.

In some embodiments, the above options can be applied for licensed spectrum, unlicensed spectrum, frequency division duplex (FDD) pattern, time division duplex (TDD) pattern, or any combinations thereof.

Figure 13:
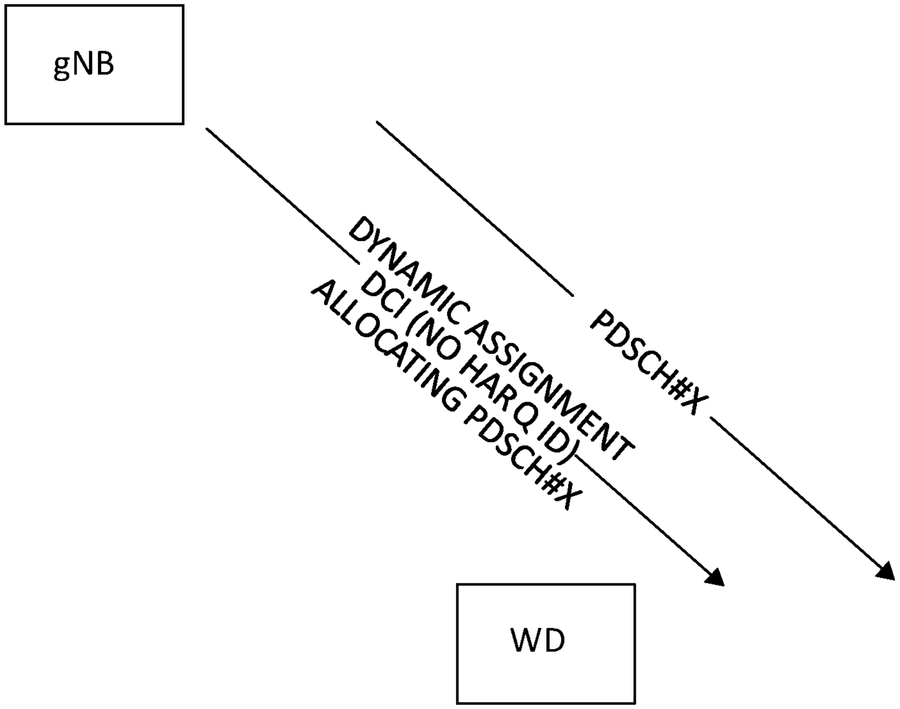
FIG. 13 is an illustration of side by side PDSCH and DCI DL transmission.
Figure 14:
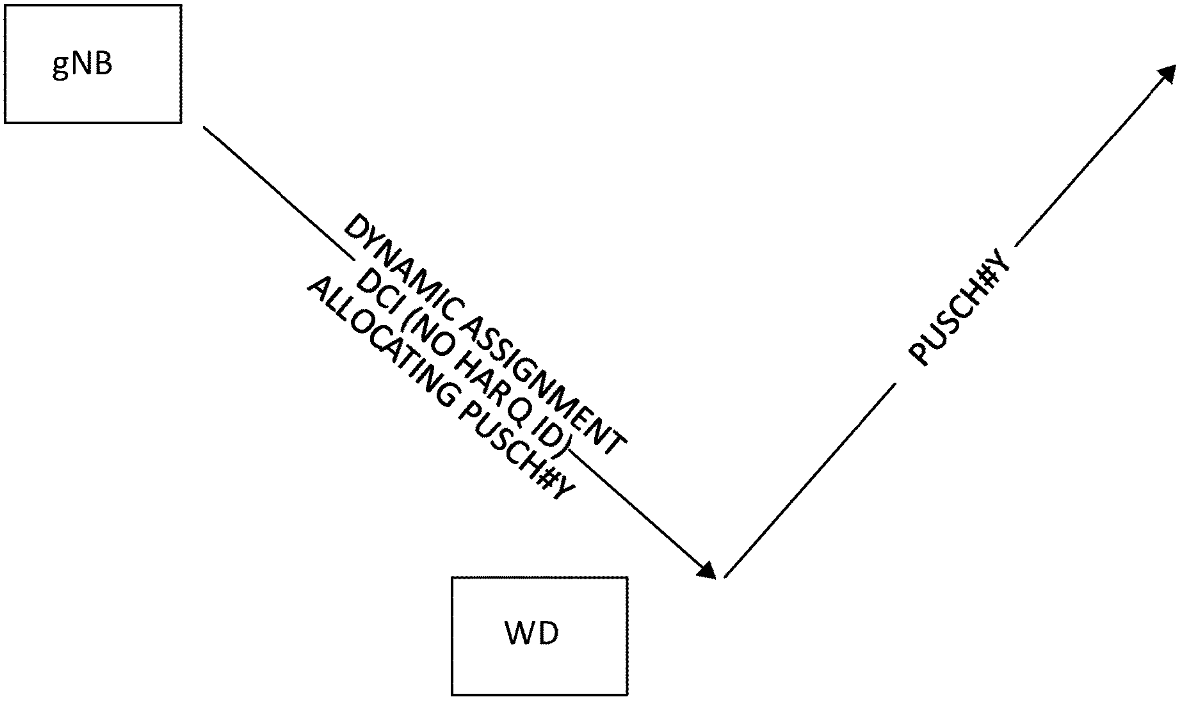
FIG. 14 is an illustration of a dynamic grant DCI and a PUSCH transmission.

In some embodiments, when a network node 16 allocates a "dynamic grant" (for single or multiple PUSCHs/PDSCHs/PSSCHs), the network node 16 does not specify the HARQ ID in the dynamic grant DCI (referred to hereinafter as a HARQ ID-less grant DCI). See FIGS. 13 and 14.

In some embodiments, the network node 16 sends HARQ ID-less grant DCI for PUSCH allocation in response to the WD 22 sending a specific scheduling request (SR). These specific SRs may indicate a low latency transmission request, which can be understood by the network node 16, for example, when:

a. The SR includes some bit indicating a low latency scheduling request;

b. The SR is transmitted with some sequence which maps to a low latency request; or c. The SR is transmitted over the resource (PRB/slot/carrier/cell/BWP/transmission reception point (TRP)/sub-slot/mini-slot) where the resource is mapped to a low latency request.

Figure 15:
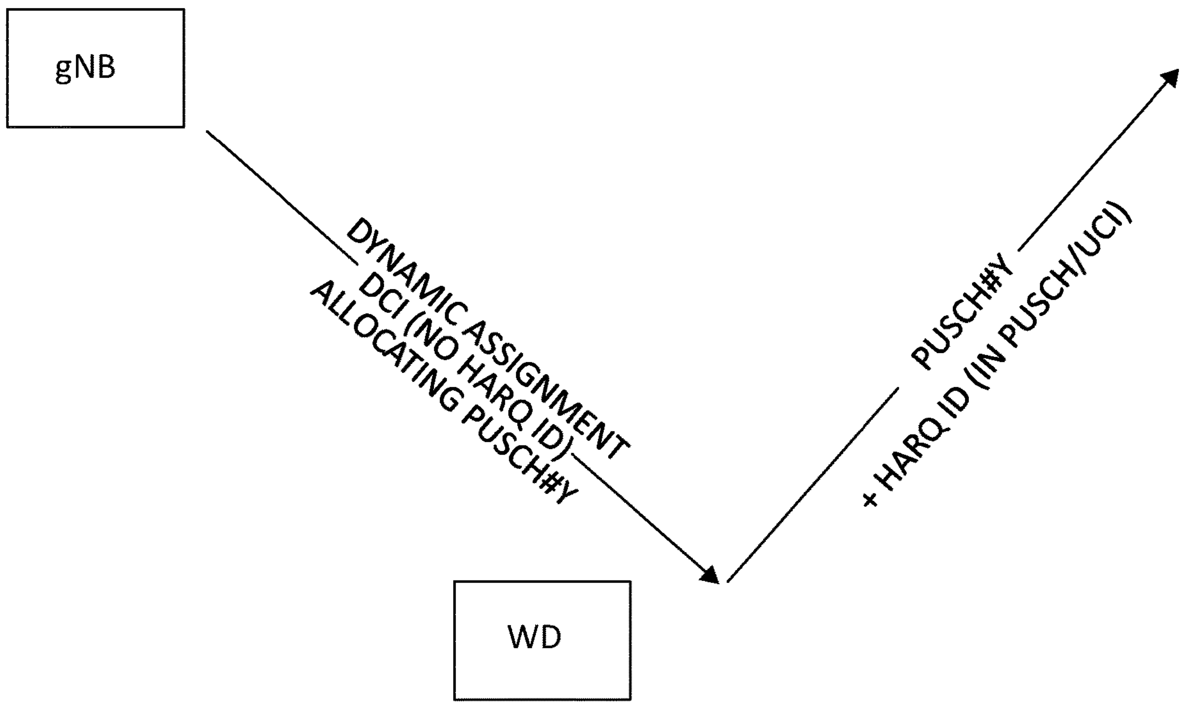
FIG. 15 is an illustration of dynamic grant DCI and a PUSCH plus HARQ ID transmission.

In some embodiments, if the network node 16 sends a HARQ ID-less grant DCI for dynamic PUSCH allocation (single or multi-PUSCHs) to the WD 22, then the WD 22 can select or mention the HARQ ID, either in a PUSCH transmission or in UCI multiplexed with PUSCH. See FIG. 15. The HARQ ID selection by the WD 22 can be, for example, autonomous from some defined HARQ ID pool, or the WD 22 may select the HARQ ID based on some deterministic rule (which the network node 16 can also derive with the same deterministic rule).

In some embodiments, the network node 16 sends HARQ ID-less grant DCI for PDSCH allocation, such that the WD 22 is not required to send feedback (HARQ-ACK) for the PDSCH transmission.

In some embodiments, the network node 16 sends HARQ ID-less grant DCI for PDSCH allocation, such that the network node 16 does not allocate a HARQ-ACK feedback resource for reporting feedback. This means that the K1 pointer is not configured in the DCI. In known methods, the K1 pointer (or PDSCH-to-HARQ feedback timing indicator) included in DCI (or mapped to RRC) depicts the HARQ-ACK feedback resource with respect to PDSCH.

In some embodiments, the network node 16 sends HARQ ID-less grant DCI for PUSCH allocation, such that the WD 22 does not expect to receive feedback (HARQ-ACK) for the PUSCH transmission from the network node 16.

In some embodiments, the HARQ ID-less scheduling grants are treated as high priority grants. This is because there may not be no retransmission. Therefore, the receiving node must try to decode the transmission (PUSCH/PDSCH). In case the transmission is a PUSCH transmission, then the WD 22 may prioritize the transmission associated with HARQ ID-less grant over other/non-prioritized TBs/grants. In some embodiments, the HARQ ID-less scheduling grants are treated as low priority grants. This can happen because retransmissions are not necessary when the scenario does not require high reliability.

In some embodiments, the network node 16 sends HARQ ID-less grant DCI, where HARQ ID is not included in the DCI but is derived for the scheduled grant based on some deterministic function. For example:

cc) The HARQ ID may be derived as a function of resource over which HARQ ID-less grant DCI is transmitted or received; and/or dd) The HARQ ID may be derived as a function of PDSCH/PUSCH resource allocation which is associated with HARQ ID-less grant DCI.

In some embodiments, the receiving node sends a feedback acknowledgment (ACK) or non-acknowledgement (NACK) corresponding to the time window over which transmissions (e.g., N transmissions) are received, where the transmissions are associated with HARQ ID less grants (that is, these N transmissions have no HARQ ID). The network node 16 can define a rule to decide upon what basis the receiving node should send ACK or NACK. For example, in one rule, the receiving node sends a NACK when the receiving node decodes X % (i.e., ceil/floor(X*N/100)) or less than X % of transmissions in the time window. Otherwise, the receiving node sends an ACK. Upon receiving a NACK, the transmitting node may retransmit all the transmissions (i.e., retransmits N transmissions) from that time window again.

In some embodiments, if the HARQ ID is absent, or not configured, or the HARQ ID field is used for other purposes (instead referring to HARQ ID), then the new data indicator (NDI) bit may be absent, or not configured or used for another purpose. This is because, by default, the grant associated with HARQ ID-less scheduling grant DCI may be assumed to be meant for a new data transmission.

In some embodiments, the HARQ ID-less grant is configured with specific values for parameters, e.g., modulation and coding scheme (MCS), TB size, frequency domain resource assignment (FDRA), number of repetitions, random variable (RV), BWP indicator, carrier indicator, etc. Therefore, these parameters are may not be required to be indicated by the DCI. Specific values can be defined in RRC. As a result, DCI can be made substantially lighter.

In some embodiments, the network allocates a subset of HARQ IDs to the WD 22 for autonomous selection by the WD 22, where each subset of HARQ IDs represents a traffic association based on quality of service (QoS), reliability, latency budget, priority, etc. The network node 16 may allocate a dynamic UL PUSCH grant using a HARQ ID-less grant DCI. Now, over the grant, the WD 22 can include HARQ ID (from a subset). For example, the WD 22 can include the HARQ ID in the PUSCH or UCI (multiplexed with PUSCH) that best represents the transmission. For example, the network node 16 may allocate two subsets where the first subset contains HARQ IDs 1 to 8 representing traffic of low priority and where the second subset contains HARQ IDs 9 to 16 representing traffic of high priority. The network node 16 may allocate a grant using HARQ ID-less grant DCI. When the WD 22 transmits high priority UL traffic, for example, the transmission can include any HARQ ID from the second subset in the PUSCH transmission.

In some embodiments, in the grant DCI, the network node 16 does not mention explicit HARQ ID but it mentions or includes the subset number or identity. When the WD 22 transmits over the grant, it can include a HARQ ID associated with that subset.

In NR-U CG (3GPP Technical Release 16), the HARQ ID is included in UCI multiplexed with the CG PUSCH. In some embodiments, the transmission over NR-U CG PUSCH does not include UCI. This means no HARQ ID is sent alongside PUSCH. In one option, UCI is sent alongside PUSCH, but it does not include HARQ ID. This scenario may be acceptable when retransmissions for CG transmissions are not needed.

In some embodiments, a large grant or assignment can be a dynamic or SPS/CG, where in an SPS/CG period, a large grant or assignment means the repeated grant/assignment is transmitted/received with transmissions without allocating HARQ ID (in DCI/RRC). This is useful in XR as the time domain size of grant is so large, that there is not enough time budgeted for retransmissions. For example, the WD 22 may be allocated with CG where each CG period include a grant of a size such as 40 slots. When the network node 16 receives erroneous transmission for this large transmission in a period, then no retransmission is performed, in some embodiments.

As used herein, grant DCI means DCI allocating a PUSCH or multiples of PUSCH; assignment DCI means DCI allocating a PDSCH or multiples of PDSCH. Also, terms such as HPN or HARQ ID or HARQ process ID can be used interchangeably. At least some embodiments can be applied to new DCI scheduling formats or existing formats, e.g., 0_0, 0_1, 0_2, 1_0, 1_1, 1_2, 3_0, etc. At least some embodiments disclosed herein can be applied to both asynchronous and synchronous HARQs. The DCI can be SLCI (sidelink control information) in case of sidelink (SL) or device to device (D2D) operation.

According to one aspect, a network node 16 is configured to communicate with a wireless device, WD 22. The network node 16 includes a radio interface 62 and/or processing circuitry 68 configured to limit a maximum number of hybrid automatic repeat request, HARQ, processes, N, between a WD 22 and the network node 16 based at least in part on a traffic requirement of the WD 22.

According to this aspect, in some embodiments, N is received from the WD 22. In some embodiments, the network node 16, radio interface 62 and/or processing circuitry 68 is further configured to allocate a HARQ pool to the WD 22, HARQ processes in the HARQ pool being selected randomly or based on a formula. In some embodiments, the HARQ pool comprises sub-pools, each sub-pool corresponding to a different traffic flow with the WD 22. In some embodiments, at least N, an indication of a formula for deriving a HARQ process number, HPN, or a HARQ pool configuration are transmitted to the WD 22. In some embodiments, a HARQ process number, HPN, is determined based at least in part from resource mapping for a data transmission. In some embodiments, the HARQ process number, HPN, is determined based on at least one of a special frame number, a slot number, a sub-slot number, a subcarrier spacing value, a demodulation reference signal placement and/or a transmission size. In some embodiments, a HARQ process number, HPN. is transmitted to the WD 22 in downlink control information, DCI. In some embodiments, a transmission corresponding to a HARQ process indicated by the HPN is assumed to be a retransmission. In some embodiments, a transmission corresponding to a HARQ process indicated by the HPN is assumed to be an initial transmission. In some embodiments, the network node 16, radio interface 62 and/or processing circuitry 68 is further configured to allocate a HARQ ID-less grant without specifying a HARQ process number, HPN, in a downlink control information, DCI. In some embodiments, the HARQ ID-less grant is sent in response to a scheduling request, SR, from the WD 22. In some embodiments, the network node 16, radio interface 62 and/or processing circuitry 68 is further configured to allocate a subset of HARQ IDs to the WD 22 for autonomous selection by the WD 22.

According to another aspect, a method implemented in a network node 16 includes limiting a maximum number of hybrid automatic repeat request, HARQ, processes, N, between a WD 22 and the network node 16 based at least in part on a traffic requirement of the WD 22.

According to this aspect, in some embodiments, N is received from the WD 22. In some embodiments, the method further includes allocating a HARQ pool to the WD 22, HARQ processes in the HARQ pool being selected randomly or based on a formula. In some embodiments, the HARQ pool comprises sub-pools, each sub-pool corresponding to a different traffic flow with the WD 22. In some embodiments, at least N, an indication of a formula for deriving a HARQ process number, HPN, or a HARQ pool configuration are transmitted to the WD 22. In some embodiments, a HARQ process number, HPN, is determined based at least in part from resource mapping for a data transmission. In some embodiments, the HARQ process number, HPN, is determined based on at least one of a special frame number, a slot number, a sub-slot number, a subcarrier spacing value, a demodulation reference signal placement and/or a transmission size. In some embodiments, a HARQ process number, HPN. is transmitted to the WD 22 in downlink control information, DCI. In some embodiments, a transmission corresponding to a HARQ process indicated by the HPN is assumed to be a retransmission. In some embodiments, a transmission corresponding to a HARQ process indicated by the HPN is assumed to be an initial transmission. In some embodiments, the method also includes allocating a HARQ ID-less grant without specifying a HARQ process number, HPN, in a downlink control information, DCI. In some embodiments, the HARQ ID-less grant is sent in response to a scheduling request, SR, from the WD 22. In some embodiments, the method further includes allocating a subset of HARQ IDs to the WD 22 for autonomous selection by the WD 22.

According to yet another aspect, a WD 22 is configured to communicate with a network node 16. The WD 22 includes a radio interface 82 and/or processing circuitry 84 configured to determine a maximum number of hybrid automatic repeat request, HARQ, processes, N, between the WD 22 and the network node 16 based at least in part on a traffic requirement of the WD 22.

According to this aspect, in some embodiments, the WD 22, radio interface 82 and/or processing circuitry 84 is further configured to transmit the determined maximum number of HARQ processes N. In some embodiments, the WD 22, radio interface 82 and/or processing circuitry 84 is further configured to select a HARQ process number, HPN, from a pool of HPNs received from the network node 16. In some embodiments, the selecting random or is based at least in part on a formula. In some embodiments, a different HPN is selected for different traffic flows. In some embodiments, the WD 22, radio interface 82 and/or processing circuitry 84 are further configured to send the HPN to the network node 16. In some embodiments, the WD 22, radio interface and/or processing circuitry is configured to derive a HARQ process number, HPN, from resource mapping. In some embodiments, the HPN is calculated based on resources that include at least one of special frame number, slot number, sub-slot number, subcarrier spacing value, demodulation reference signal placement and transmission size. In some embodiments, the WD 22, radio interface 82 and/or processing circuitry 84 is configured to refrain from sending a HARQ acknowledgement, ACK or non-acknowledgment, NACK, when a HARQ ID-less grant is received. In some embodiments, the WD 22, radio interface 82 and/or processing circuitry 84 is configured to send a HARQ acknowledgement, ACK or non-acknowledgment, NACK, according to a rule defined by the network node 16.

According to another aspect, a method implemented in a wireless device (WD 22) includes determining a maximum number of hybrid automatic repeat request, HARQ, processes, N, between the WD 22 and the network node 16 based at least in part on a traffic requirement of the WD 22.

According to this aspect, in some embodiments the method further includes transmitting the determined maximum number of HARQ processes N. In some embodiments, the method further includes selecting a HARQ process number, HPN, from a pool of HPNs received from the network node 16. In some embodiments, the selecting random or is based at least in part on a formula. In some embodiments, a different HPN is selected for different traffic flows. In some embodiments, the method also includes sending the HPN to the network node 16. In some embodiments, the method further includes deriving a HARQ process number, HPN, from resource mapping. In some embodiments, the HPN is calculated based on resources that include at least one of special frame number, slot number, sub-slot number, subcarrier spacing value, demodulation reference signal placement and transmission size. In some embodiments, the method also includes refraining from sending a HARQ acknowledgement, ACK or non-acknowledgment, NACK, when a HARQ ID-less grant is received. In some embodiments, the method also includes sending a HARQ acknowledgement, ACK or non-acknowledgment, NACK, according to a rule defined by the network node 16.

Some embodiments may include one or more of the following:

Embodiment A1. A network node configured to communicate with a wireless device, WD, the network node configured to, and/or comprising a radio interface and/or comprising processing circuitry configured to:

limit a maximum number of hybrid automatic repeat request, HARQ, processes, N, between a WD and the network node based at least in part on a traffic requirement of the WD.

Embodiment A2. The network node of Embodiment A1, wherein Nis received from the WD.

Embodiment A3. The network node of any of Embodiments A1 and A2, wherein the network node, radio interface and/or processing circuitry is further configured to allocate a HARQ pool to the WD, HARQ processes in the HARQ pool being selected randomly or based on a formula.

Embodiment A4. The network node of Embodiment A3, wherein the HARQ pool comprises sub-pools, each sub-pool corresponding to a different traffic flow with the WD.

Embodiment A5. The network node of any of Embodiments A1-A4, wherein at least N, an indication of a formula for deriving a HARQ process number, HPN, or a HARQ pool configuration are transmitted to the WD.

Embodiment A6. The network node of any of Embodiments A1-A5, wherein a HARQ process number, HPN, is determined based at least in part from resource mapping for a data transmission.

Embodiment A7. The network node of Embodiment A6, wherein the HARQ process number, HPN, is determined based on at least one of a special frame number, a slot number, a sub-slot number, a subcarrier spacing value, a demodulation reference signal placement and/or a transmission size.

Embodiment A8. The network node of any of Embodiments A1-A7, wherein a HARQ process number, HPN. is transmitted to the WD in downlink control information, DCI.

Embodiment A9. The network node of Embodiment A8, wherein a transmission corresponding to a HARQ process indicated by the HPN is assumed to be a retransmission.

Embodiment A10. The network node of Embodiment A8, wherein a transmission corresponding to a HARQ process indicated by the HPN is assumed to be an initial transmission.

Embodiment A11. The network node of any of Embodiments A1-A10, wherein the network node, radio interface, and/or processing circuitry is further configured to allocate a HARQ ID-less grant without specifying a HARQ process number, HPN, in a downlink control information, DCI.

Embodiment A12. The network node of Embodiment A11, wherein the HARQ ID-less grant is sent in response to a scheduling request, SR, from the WD. Embodiment A13. The network node of any of Embodiments A1-A12, wherein the network node, radio interface and/or processing circuitry is further configured to allocate a subset of HARQ IDs to the WD for autonomous selection by the WD.

Embodiment B1. A method implemented in a network node, the method comprising:

limiting a maximum number of hybrid automatic repeat request, HARQ, processes, N, between a WD and the network node based at least in part on a traffic requirement of the WD.

Embodiment B2. The method of Embodiment B1, wherein Nis received from the WD.

Embodiment B3. The method of any of Embodiments B1 and B2, further comprising allocating a HARQ pool to the WD, HARQ processes in the HARQ pool being selected randomly or based on a formula.

Embodiment B4. The method of Embodiment B3, wherein the HARQ pool comprises sub-pools, each sub-pool corresponding to a different traffic flow with the WD.

Embodiment B5. The method of any of Embodiments B1-B4, wherein at least N, an indication of a formula for deriving a HARQ process number, HPN, or a HARQ pool configuration are transmitted to the WD.

Embodiment B6. The method of any of Embodiments B1-B5, wherein a HARQ process number, HPN, is determined based at least in part from resource mapping for a data transmission.

Embodiment B7. The method of Embodiment B6, wherein the HARQ process number, HPN, is determined based on at least one of a special frame number, a slot number, a sub-slot number, a subcarrier spacing value, a demodulation reference signal placement and/or a transmission size.

Embodiment B8. The method of any of Embodiments B1-B7, wherein a HARQ process number, HPN. is transmitted to the WD in downlink control information, DCI.

Embodiment B9. The method of Embodiment B8, wherein a transmission corresponding to a HARQ process indicated by the HPN is assumed to be a retransmission.

Embodiment B10. The method of Embodiment B8, wherein a transmission corresponding to a HARQ process indicated by the HPN is assumed to be an initial transmission.

Embodiment B11. The method of any of Embodiments B1-B10, further comprising allocating a HARQ ID-less grant without specifying a HARQ process number, HPN, in a downlink control information, DCI.

Embodiment B12. The method of Embodiment B11, wherein the HARQ ID-less grant is sent in response to a scheduling request, SR, from the WD.

Embodiment B13. The method of any of Embodiments B1-B12, further comprising allocating a subset of HARQ IDs to the WD for autonomous selection by the WD.

Embodiment C1. A wireless device (WD) configured to communicate with a network node, the WD configured to, and/or comprising a radio interface and/or processing circuitry configured to:

determine a maximum number of hybrid automatic repeat request, HARQ, processes, N, between the WD and the network node based at least in part on a traffic requirement of the WD.

Embodiment C2. The WD of Embodiment C1, wherein the WD, radio interface and/or processing circuitry is further configured to transmit the determined maximum number of HARQ processes N.

Embodiment C3. The WD of any of Embodiments C1 and C2, wherein the WD, radio interface and/or processing circuitry is further configured to select a HARQ process number, HPN, from a pool of HPNs received from the network node.

Embodiment C4. The WD of Embodiment C3, wherein the selecting random or is based at least in part on a formula.

Embodiment C5. The WD of Embodiment C3, wherein a different HPN is selected for different traffic flows.

Embodiment C6. The WD of any of Embodiments C1-C3 and C5, wherein the WD, radio interface and/or processing circuitry are further configured to send the HPN to the network node.

Embodiment C7. The WD of any of Embodiments C1-C6, wherein the WD, radio interface and/or processing circuitry is configured to derive a HARQ process number, HPN, from resource mapping.

Embodiment C8. The WD of Embodiment C7, wherein the HPN is calculated based on resources that include at least one of special frame number, slot number, sub-slot number, subcarrier spacing value, demodulation reference signal placement and transmission size.

Embodiment C9. The WD of Embodiment C3, wherein the WD, radio interface and/or processing circuitry is configured to refrain from sending a HARQ acknowledgement, ACK or non-acknowledgment, NACK, when a HARQ ID-less grant is received.

Embodiment C10. The WD of any of Embodiments C3-C9, wherein the WD, radio interface and/or processing circuitry is configured to send a HARQ acknowledgement, ACK or non-acknowledgment, NACK, according to a rule defined by the network node.

Embodiment D1. A method implemented in a wireless device (WD), the method comprising:

determining a maximum number of hybrid automatic repeat request, HARQ, processes, N, between the WD and the network node based at least in part on a traffic requirement of the WD.

Embodiment D2. The method of Embodiment D1, further comprising transmitting the determined maximum number of HARQ processes N.

Embodiment D3. The method of any of Embodiments D1 and D2, further comprising selecting a HARQ process number, HPN, from a pool of HPNs received from the network node.

Embodiment D4. The method of Embodiment D3, wherein the selecting random or is based at least in part on a formula.

Embodiment D5. The method of Embodiment D3, wherein a different HPN is selected for different traffic flows.

Embodiment D6. The method of any of Embodiment D1-D3 and D5, further comprising sending the HPN to the network node.

Embodiment D7. The method of any of Embodiments D1-D6, further comprising deriving a HARQ process number, HPN, from resource mapping.

Embodiment D8. The method of Embodiment D7, wherein the HPN is calculated based on resources that include at least one of special frame number, slot number, sub-slot number, subcarrier spacing value, demodulation reference signal placement and transmission size.

Embodiment D9. The method of Embodiment D3, further comprising refraining from sending a HARQ acknowledgement, ACK or non-acknowledgment, NACK, when a HARQ ID-less grant is received.

Embodiment D10. The method of any of Embodiments D3-D9, further comprising sending a HARQ acknowledgement, ACK or non-acknowledgment, NACK, according to a rule defined by the network node.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node configured to communicate with a plurality of wireless devices, WDs, the method comprising:

configuring a first WD of the plurality of WDs with a maximum number N of hybrid automatic repeat request, HARQ, HPN, processes between the first WD of the plurality of WDs and the network node, the maximum number N being based at least in part on subcarrier spacing associated with the first WD; and allocating a HARQ ID-less grant without specifying an HPN in downlink control information, DCI.

2. The method of claim 1, further comprising:

receiving a scheduling request from the first WD; and receiving a recommended maximum number of HARQ processes based on which the HPN is calculated.

3. The method of claim 1, further comprising:

allocating a HARQ process pool to the first WD, in which N HARQ processes are included in the HARQ process pool to be selectable by the first WD.

4. The method of claim 1, wherein the maximum number N is calculated at least partly based on a traffic requirement of at least one WD of the plurality of WDs.

5. The method of claim 1, wherein the HARQ ID-less grant indicates allocation of resources so that the first WD can derive the maximum number N when retransmission is needed.

6. A network node configured to communicate with a plurality of wireless devices, WDs, the network node comprising;

processing circuitry, the processing circuitry configured to:

configure a first WD of the plurality of WDs with a maximum number N of hybrid automatic repeat request, HARQ, HPN, processes between the first WD of the plurality of WDs and the network node, the maximum number N being based at least in part on subcarrier spacing associated with the first WD; and allocate a HARQ ID-less grant without specifying an HPN in downlink control information, DCI.

7. The network node of claim 6, wherein the processing circuitry is further configured to receive a scheduling request from the first WD and receive a recommended maximum number of HARQ processes based on which the HPN is calculated.

8. A method in a wireless device, WD, configured to communicate with a network node, the method comprising:

receiving a configuration from the network node with a maximum number of N, of hybrid automatic repeat request, HARQ, HPN, processes between the WD and the network node; and determining a set of M number of hybrid automatic repeat request, HARQ, processes between the WD and the network node, the M HARQ processes being selected from the HPN of HARQ processes; and receiving a downlink control information that includes a HARQ ID-less grant without specifying an HPN.

9. The method of claim 8, further comprising:

transmitting a scheduling request to the network node, in which traffic requirement of the WD is included.

10. The method of claim 8, further comprising:

receiving an allocation of a HARQ process pool in which HPN of HARQ processes are indicated, wherein the set of M number of HARQ processes are selected from the HARQ process pool.

11. The method of claim 9, further comprising:

transmitting a recommended maximum number of HARQ processes to include in a HARQ process pool.

12. The method of claim 8, wherein the selecting is one of: random selection, selecting based at least in part on a formula, and selecting based at least in part on a traffic flow of the WD.

13. The method of claim 12, wherein a HARQ process pool comprises sub-pools each of which corresponds to a different traffic flow with the WD; wherein the selecting based at least in part on a traffic flow of the first WD comprise: selecting from a corresponding sub-pool.

14. The method of claim 8, further comprising:

when retransmission is needed, deriving an HPN from resource mapping based on the received DCI.

15. A wireless device, WD, configured to communicate with a network node, the WD comprising:

processing circuitry, the processing circuitry configured to:

receive a configuration from the network node with a maximum number of N, of hybrid automatic repeat request, HARQ, HPN, processes between the WD and the network node; and determine a set of M hybrid automatic repeat request, HARQ, processes, between the WD and the network node, the M HARQ processes being selected from the HPN HARQ processes; and receive a HARQ ID-less grant that does not specify an HPN in downlink control information, DCI.

16. The wireless device of claim 15, wherein the processing circuitry is further configured to cause the wireless device to transmit a scheduling request to the network node, in which traffic requirement of the first WD is included.

17. The wireless device of claim 15, wherein the processing circuitry is further configured to cause the wireless device to receive an allocation of a HARQ process pool in which HPN of HARQ processes are indicated, wherein the set of M number of HARQ processes are selected from the HARQ process pool.

18. The wireless device of claim 15, wherein the processing circuitry is further configured to cause the wireless device to transmit a recommended maximum number of HARQ processes to include in a HARQ process pool.

* * * * *